US012545569B2

(12) United States Patent
Natarajan

(10) Patent No.: US 12,545,569 B2
(45) Date of Patent: Feb. 10, 2026

(54) BEVERAGE DISPENSING SYSTEMS WITH REMOTE MICRO-INGREDIENT STORAGE SYSTEMS

(71) Applicant: THE COCA-COLA COMPANY, Atlanta, GA (US)

(72) Inventor: Arun Natarajan, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 327 days.

(21) Appl. No.: 17/431,611

(22) PCT Filed: Feb. 19, 2020

(86) PCT No.: PCT/US2020/018752
§ 371 (c)(1),
(2) Date: Aug. 17, 2021

(87) PCT Pub. No.: WO2020/172225
PCT Pub. Date: Aug. 27, 2020

(65) Prior Publication Data
US 2022/0135389 A1 May 5, 2022

Related U.S. Application Data

(60) Provisional application No. 62/808,354, filed on Feb. 21, 2019.

(51) Int. Cl.
*B67D 1/00* (2006.01)
*B67D 1/06* (2006.01)

(52) U.S. Cl.
CPC ......... *B67D 1/0021* (2013.01); *B67D 1/0044* (2013.01); *B67D 1/06* (2013.01);
(Continued)

(58) Field of Classification Search
CPC .. B67D 1/0044; B67D 1/0021; B67D 1/0046; B67D 1/0031; B67D 1/0034;
(Continued)

(56) References Cited

U.S. PATENT DOCUMENTS 2,894,664 A 7/1959 Mroz
5,738,248 A * 4/1998 Green .................. B67D 1/0046 222/145.6
(Continued)

FOREIGN PATENT DOCUMENTS

EP 1876137 A1 1/2008
KR 10-1996-0020888 A 7/1996
(Continued)

OTHER PUBLICATIONS

Supplementary European Search Report, EP20758640.5, dated Nov. 10, 2022 (1 p.).
(Continued)

*Primary Examiner* — Charles P. Cheyney
(74) *Attorney, Agent, or Firm* — Eversheds Sutherland (US) LLP

(57) ABSTRACT

The present application thus provides a beverage dispensing system for combining a micro-ingredient and a diluent. The beverage dispensing system may include a nozzle and a remote micro-ingredient storage system positioned at a distance from the nozzle. The remote micro-ingredient storage system may include a recirculation loop in communication with the nozzle to agitate the micro-ingredient therein.

12 Claims, 1 Drawing Sheet

(52) U.S. Cl.
CPC ................ *B67D 2001/0091* (2013.01); *B67D 2210/0012* (2013.01)

(58) Field of Classification Search
CPC ............................... B67D 1/0037; B67D 1/06; B67D 2210/0012; B67D 2001/0091
USPC .......................... 222/1, 129.1, 145.1, 148, 67
See application file for complete search history.

(56) References Cited

U.S. PATENT DOCUMENTS

| | | | | |
|---|---|---|---|---|
| 5,842,600 | A * | 12/1998 | Singleterry | B01F 23/2363 261/DIG. 7 |
| 6,439,437 | B1 * | 8/2002 | Ollier | A23L 2/54 141/82 |
| 10,625,219 | B2 * | 4/2020 | Bandixen | B01F 25/431 |
| 2001/0006176 | A1 * | 7/2001 | Haselden, Jr. | A23L 2/00 222/64 |
| 2004/0099688 | A1 * | 5/2004 | Davis | B67D 1/0044 222/145.1 |
| 2006/0097009 | A1 * | 5/2006 | Bethuy | B67D 1/0081 222/129.1 |
| 2006/0168986 | A1 * | 8/2006 | Saitoh | F25B 49/025 62/396 |
| 2007/0257059 | A1 * | 11/2007 | Stevenson | B67D 1/0021 222/145.6 |
| 2012/0230148 | A1 | 9/2012 | Van Opstal et al. | |
| 2015/0210522 | A1 * | 7/2015 | Jersey | B67D 1/0028 222/134 |
| 2016/0100709 | A1 | 4/2016 | Rudick et al. | |
| 2018/0044161 | A1 * | 2/2018 | Moore | B67D 1/0885 |
| 2022/0063980 | A1 * | 3/2022 | Rudick | B67D 1/0031 |
| 2023/0108596 | A1 * | 4/2023 | Boissy | B01F 23/2362 426/477 |

FOREIGN PATENT DOCUMENTS

| | | | | |
|---|---|---|---|---|
| WO | 2017/123402 | A1 | 7/2017 | |
| WO | WO-2018064451 | A1 * | 4/2018 | B67D 1/0031 |

OTHER PUBLICATIONS

Extended European Search Report , EP20758640.5, dated Oct. 24, 2022 (11 pp.).
International Search Report and Written Opinion, PCT/US2020/018752, Jun. 15, 2020 (10 pp.).

* cited by examiner

BEVERAGE DISPENSING SYSTEMS WITH REMOTE MICRO-INGREDIENT STORAGE SYSTEMS

TECHNICAL FIELD

The present application and the resulting patent relate generally to beverage dispensing systems and more particularly relate to beverage dispensing systems with remote micro-ingredient storage systems using agitation in a recirculation loop to prevent micro-ingredient separation.

BACKGROUND OF THE INVENTION

Conventional post-mix beverage dispensers generally mix streams of syrup, concentrate, sweetener, bonus flavors, other types of flavoring, and other ingredients with water or other types of diluents. Preferably, the beverage dispenser may provide as many types and flavors of beverages as may be possible in a footprint that may be as small as possible. Recent improvements in beverage dispensing technology have focused on the use of micro-ingredients. With micro-ingredients, the traditional beverage bases may be separated into a number of constituent parts at much higher dilution or reconstitution ratios. A beverage dispenser using micro-ingredients thus may provide the consumer with many more beverage options as compared to a conventional beverage dispenser using a limited number of beverage syrups.

Depending upon the intended location for the beverage dispenser and/or other considerations, some or all of the ingredients used in the beverage dispenser may be stored at a distance from the beverage dispenser and/or from the dispensing nozzle. For example, the sweetener may be stored in a conventional bag-in-box at a distance from the beverage dispenser. The flow of sweetener and/or other types of fluids may pass through a chiller that is remote from the beverage dispenser and/or the dispensing nozzle so as to keep the fluids chilled to the appropriate temperature.

Likewise with respect to micro-ingredients, such ingredients may be stored in or near the beverage dispenser. In certain locations, however, access to the beverage dispenser may be difficult or at least inconvenient in certain circumstances and/or during certain times of day. For example, in a busy drive through window or in a busy dining area, the restaurant operator may not want to stop the beverage dispenser from dispensing so as to replace the micro-ingredients therein. Storing the micro-ingredients at a remote location, however, may lead to product separation before the micro-ingredients reach the beverage dispenser.

SUMMARY OF THE INVENTION

The present application and the resultant patent thus provides a beverage dispensing system for combining a micro-ingredient and a diluent. The beverage dispensing system may include a nozzle and a remote micro-ingredient storage system positioned at a distance from the nozzle. The remote micro-ingredient storage system may include a recirculation loop in communication with the nozzle to agitate the micro-ingredient therein.

The present application and the resultant patent further may describe a method of remotely dispensing a micro-ingredient to a nozzle. The method may include the steps of storing the micro-ingredient at a distance from the nozzle, pumping the micro-ingredient to a recirculation loop, agitating the micro-ingredient in the recirculation loop, and pumping the micro-ingredient from the recirculation loop to the nozzle.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
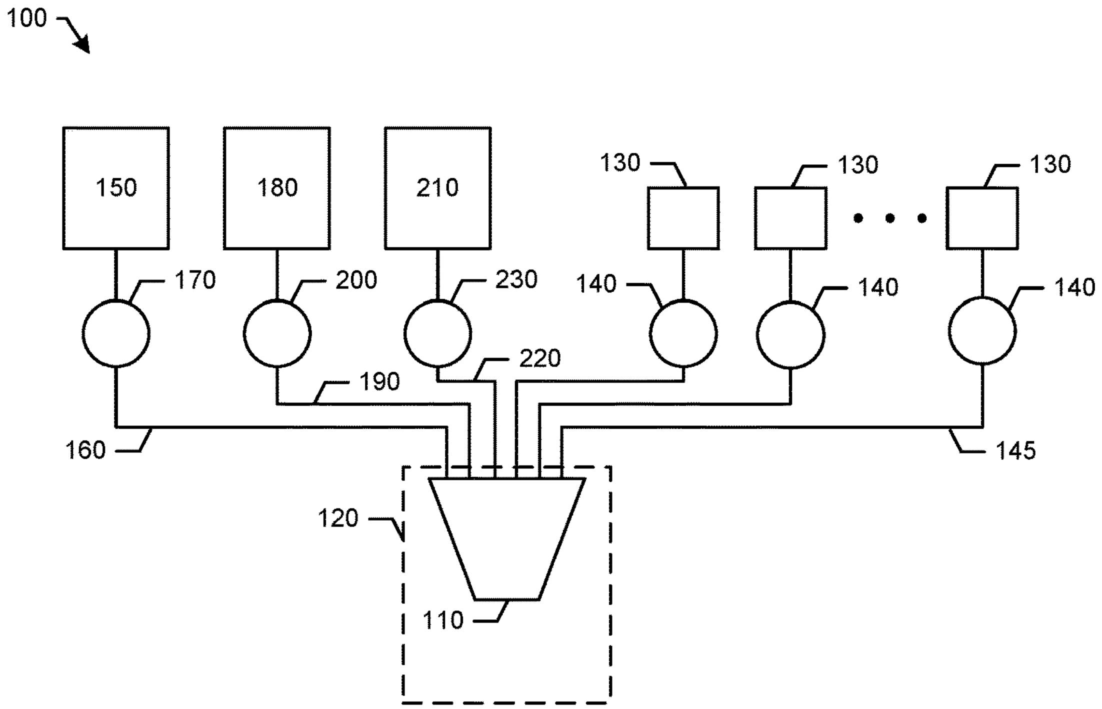
FIG. 1 is a schematic diagram of an example of a beverage dispensing system.

Referring now to the drawings, in which like numerals refer to like elements throughout the several views, FIG. 1 shows an example of a beverage dispensing system 100 as may be described herein. The beverage dispensing system 100 may be used for dispensing many different types of beverages or other types of fluids. Specifically, the beverage dispensing system 100 may be used with diluents, macro-ingredients, micro-ingredients, and other types of fluids. The diluents generally include plain water (still water or non-carbonated water), carbonated water, and other fluids. Any type of fluid may be used herein.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), concentrated extracts, purees, and similar types of ingredients. Other ingredients may include dairy products, soy, and rice concentrates. Similarly, a macro-ingredient base product may include the sweetener as well as flavorings, acids, and other common components as a beverage syrup. The beverage syrup with sugar, HFCS, or other macro-ingredient base products generally may be stored in a conventional bag-in-box container remote from the beverage dispenser. The viscosity of the macro-ingredients may range from about 1 to about 10,000 centipoise and generally over 100 centipoises when chilled. Other types of macro-ingredients and the like may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, non-nutritive ingredients, additives for controlling tartness, e.g., citric acid or potassium citrate; functional additives such as vitamins, minerals, herbal extracts, nutraceuticals; and over the counter (or otherwise) medicines such as turmeric, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

The various fluids used herein may be mixed in or about a dispensing nozzle 110. The dispensing nozzle 110 may be a conventional multi-flavor nozzle and the like. The dispensing nozzle 110 may have any suitable size, shape, or configuration. The dispensing nozzle 110 may be positioned within a dispensing tower 120. The dispensing tower 120 made have any suitable size, shape, or configuration. The dispensing tower 120 may extend from a countertop and the like and/or the dispensing tower 120 may be a free-standing structure. The dispensing tower 120 may have a number of the dispensing nozzles 110 thereon.

The micro-ingredients may be stored in a number of micro-ingredient containers 130 or other types of micro-ingredient sources. The micro-ingredient containers 130 may have any suitable size, shape, or configuration. Any number of the micro-ingredient containers 130 may be used herein. The micro-ingredient containers 130 may be in communication with the dispensing nozzle 110 via a number of micro-ingredient pumps 140 positioned on a number of micro-ingredient conduits 145. The micro-ingredient pumps 140 may be any type of conventional fluid moving device and made have any suitable volume or capacity. The micro-ingredient containers 130 may be positioned in, adjacent to, and/or remote from the dispensing nozzle 110. For example, the micro-ingredient containers 130 may be positioned under the counter top upon which the dispensing tower 120 rests. Some or all of the micro-ingredient containers 130 may be agitated.

A still water source 150 may be in communication with the dispensing nozzle 110 via a still water conduit 160. Other types of diluents may be used herein. Still water or other types of diluents may be pumped to the dispensing nozzle 110 via a still water pump 170. The still water pump 170 may be may be any type of conventional fluid moving device and made have any suitable volume or capacity. Alternatively, the pressure in a conventional municipal water source may be sufficient without the use of a pump. Any number of still water sources 150 may be used herein.

A carbonated water source 180 may be in communication with the dispensing nozzle 110 via a carbonated water conduit 190. The carbonated water source 180 may be a conventional carbonator and the like. The carbonator may have any suitable size, shape, or configuration. Carbonated water or other types of diluents may be pumped to the dispensing nozzle 110 via a carbonated water pump 200. The carbonated water pump 200 may be any type of conventional fluid moving device and made have any suitable volume or capacity. Any number of carbonated water sources 180 may be used herein. A carbonated water recirculation line also may be used herein.

One or more macro-ingredient sources 210 may be in communication with the dispensing nozzle 110 via one or more macro-ingredient conduits 220. The macro-ingredient sources 210 may include sweeteners such as high fructose corn syrup, sugar solutions, and the like. The macro-ingredient sources 210 may be a conventional bag-in-box or other type of container in any suitable size, shape, or configuration. Any number of the macro-ingredient sources 210 may be used herein. The macro-ingredients may flow to the dispensing nozzle 110 via a macro-ingredient pump 230. In this case, the macro-ingredient pump 230 may be a controlled gear pump and the like. Other types of pumps may be used herein.

Figure 2:
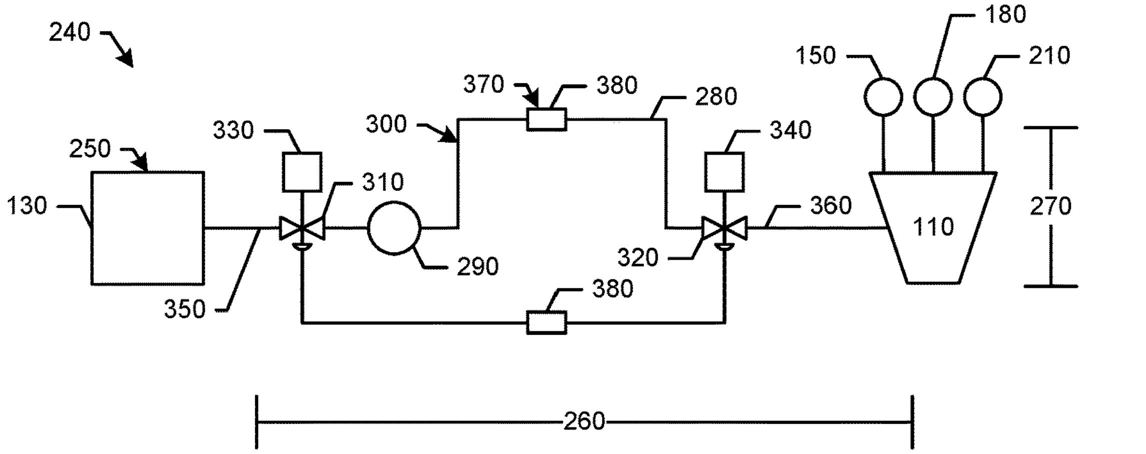
FIG. 2 is a schematic diagram of a remote micro-ingredient storage system as may be described herein for use with the beverage dispensing system of FIG. 1 and similar systems.
Figure 3:
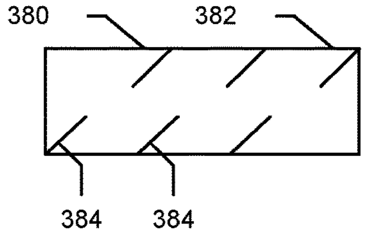
FIG. 3 is a schematic view of a static mixer.

FIG. 2 shows an example of a beverage dispensing system 240 as may be described herein. In this example, the beverage dispensing system 240 may include a remote micro-ingredient storage system 250. As described above, there may be certain circumstances where it may be advantageous to store the micro-ingredients at a distance from the dispensing tower 120. This distance may include a horizontal distance 260 and/or a vertical distance 270. The horizontal distance 260 may be about fifty feet (15.24 meters), seventy-five feet (22.86 meters), one hundred feet (30.48 meters), or more. The vertical distance may be about five feet (1.52 meters), ten feet (3.048 meters), or more. The distances from the dispensing tower 120 may vary.

The remote micro-ingredient storage system 250 may include any number of the micro-ingredient containers 130 positioned remotely from the beverage tower 120 at the horizontal distance 260. In this example, the horizontal distance 260 may be about one hundred feet (30.48 meters) or so. The micro-ingredient containers 130 may be connected to the dispensing nozzle 110 of the dispensing tower 120 via a length of flexible tubing 280 or other type of conduit made of food grade thermoplastics and the like. The length and the diameter of the tubing 280 may vary. Fixed tubing 280 also may be used herein.

The remote micro-ingredient storage system 250 may include one or more micro-ingredient pumps 290. The micro-ingredient pumps 290 may include a conventional metered pump, a positive displacement pump, a metering pump, a syringe pump, a rotary pump, a peristaltic pump, a nutating pump, a gear pump, and/or other types of fluid moving devices. Any type of pumping device capable of accurately dosing the micro-ingredients may be used herein. The micro-ingredient pump 290 also may include a variable speed motor so as to generate a variable fluid flow. Other component and other configurations may be used herein.

The remote micro-ingredient storage system 250 may include a recirculation loop 300 positioned between the micro-ingredient containers 130 and the dispensing nozzle 110. The remote micro-ingredient storage system 250 may include a first three way valve 310 and a second three way valve 320 positioned about the recirculation loop 300. The three way valves 310, 320 may be of conventional design. The first three way valve 310 may be operated by a first actuator 330 and the second three way valve 320 may be operated by a second actuator 340. The actuators 330, 340 may be of conventional design. Each micro-ingredient container 130 may be connected to the first three way valve 310 of the recirculation loop 300 by a container connector 350. The dispensing nozzle 110 may be connected to the second three way valve 320 of each recirculation loop 300 by a nozzle connector 360. Other components and other configurations may be used herein.

The remote micro-ingredient storage system 250 may include one or more agitation devices 370 positioned about the tubing 280 of the recirculation loop 300. In this example, the agitation devices 370 may take the form of a static mixer 380. Two static mixers 380 are shown herein although any number may be used. The static mixers 380 may be a passive mechanical structure such as a tube 382 with a number of internal baffles 384 or other structures therein so as to create turbulence in the flow of micro-ingredient for good mixing and to prevent product separation. Other types of passive or active agitation devices 370 may be used herein.

In use, the micro-ingredient container 130 may be connected to the first three way valve 310 of the recirculation loop 300 by the container connector 350. The dispensing nozzle 110 may be connected to the second three way valve 320 of the recirculation loop 300 by the nozzle connector 350. The first three way valve 310 may be open to the micro-ingredient container 130 by the first actuator 330 while the second three way valve 320 may be closed to the dispensing nozzle 110 by the second actuator 340. The micro-ingredient pump 290 then may fill the recirculation loop 300 with the micro-ingredient. Once the recirculation loop 300 is full, the first actuator 330 may close the first three way valve 310 to the micro-ingredient container 130 such that the micro-ingredient pump 290 may recirculate the micro-ingredient through the recirculation loop 300. The micro-ingredient pump 290 may recirculate the micro-ingredient on a periodic or continuous basis. Different types of micro-ingredients may require different recirculation schedules.

As the micro-ingredient is circulated through the recirculation loop 300, the micro-ingredient flows through the agitation device 370. In this example, the micro-ingredients flow through the static mixers 380. The static mixers 380 may create turbulence in the flow so as to promote good mixing and, hence, reducing or avoiding product separation therein. One or more cycles through the recirculation loop 300 may limit any such separation.

When a beverage is to be dispensed, the second actuator 340 may open the second three way valve 320 to the dispensing nozzle 110 such that the micro-ingredient pump 290 meters the correct volume of micro-ingredient to the dispensing nozzle 110. The first actuator 330 then may open the first third way valve 310 to the micro-ingredient container 130 so as to replenish the micro-ingredient volume in the recirculation loop. The first and the second actuators 330, 340 then may close the first and the second three way valves 310, 320 to the micro-ingredient container 130 and to the dispensing nozzle 110 so as to again allow recirculation of the micro-ingredient in the recirculation loop 300. The process may then be repeated. Other components and other configurations may be used herein.

It should be apparent that the foregoing relates only to certain embodiments of the present application and the resulting patent. Numerous changes and modifications may be made herein by one of ordinary skill in the art without departing from the general spirit and scope of the invention as defined by the following claims and the equivalents thereof.

I claim:

1. A beverage dispensing system for combining a micro-ingredient and a diluent, comprising:
- a nozzle; and
- a remote micro-ingredient storage system positioned at a distance from the nozzle;
- the remote micro-ingredient storage system comprises a recirculation loop in communication with the nozzle to agitate the micro-ingredient therein;
- the remote micro-ingredient storage system comprises a static mixer positioned about the recirculation loop;
- wherein the static mixer comprises a tube with a plurality of internal baffles;
- the remote micro-ingredient storage system comprises a micro-ingredient container with the micro-ingredient therein;
- the remote micro-ingredient storage system comprising a first three way valve in communication with the recirculation loop and the micro-ingredient container; and
- the remote micro-ingredient storage system comprising a second three way valve in communication with the recirculation loop and the nozzle.

2. The beverage dispensing system of claim 1, wherein the remote micro-ingredient storage system comprises a first actuator in communication with the first three way valve.

3. The beverage dispensing system of claim 1, wherein the remote micro-ingredient storage system comprises a container connector connecting the first three way valve and the micro-ingredient container.

4. The beverage dispensing system of claim 1, wherein the remote micro-ingredient storage system comprises a second actuator in communication with the second three way valve.

5. The beverage dispensing system of claim 1, wherein the remote micro-ingredient storage system comprises a nozzle connector connecting the second three way valve and the nozzle.

6. The beverage dispensing system of claim 4, wherein the remote micro-ingredient storage system comprises a pump in communication with the nozzle, the recirculation loop, and the micro-ingredient container.

7. The beverage dispensing system of claim 6, wherein the pump pumps the micro-ingredient from the micro-ingredient container to the nozzle with the first three way valve and the second three way valve in a first position.

8. The beverage dispensing system of claim 6, wherein the pump pumps the micro-ingredient through the recirculation loop with the first three way valve and the second three way valve in a second position.

9. The beverage dispensing system of claim 1, wherein the static mixer comprises a pair of static mixers.

10. The beverage dispensing system of claim 1, wherein the distance comprises a horizontal distance of more than about 100 feet (30.48 meters).

11. A method of remotely dispensing a micro-ingredient to a nozzle, comprising:
- storing the micro-ingredient at a distance from the nozzle;
- pumping the micro-ingredient to a recirculation loop with a first three way valve open and a second three way valve closed;
- agitating the micro-ingredient in the recirculation loop via a static mixer tube with a plurality of internal baffles with the first three way valve closed and the second three way valve closed; and
- pumping the micro-ingredient from the recirculation loop to the nozzle with the first three way valve closed and the second three way valve open.

12. The beverage dispensing system of claim 1, wherein the micro-ingredient comprises a reconstitution ratio of about ten to one or higher.

* * * * *